(12) United States Patent
Ossian

(10) Patent No.: US 8,501,271 B1
(45) Date of Patent: Aug. 6, 2013

(54) PROCESS OF MAKING COATED VEGETATION FRIENDLY ICE MELTER

(75) Inventor: Kenneth C. Ossian, Bettendorf, IA (US)

(73) Assignee: Ossian Inc., Davenport, IA (US)

( * ) Notice: Subject to any disclaimer, the term of this patent is extended or adjusted under 35 U.S.C. 154(b) by 17 days.

(21) Appl. No.: 13/417,929

(22) Filed: Mar. 12, 2012

(51) Int. Cl.
*C09K 3/18* (2006.01)

(52) U.S. Cl.
USPC ............... 427/212; 252/70; 106/13; 428/403

(58) Field of Classification Search
USPC ............... 427/212; 252/70; 106/13; 428/403
See application file for complete search history.

(56) References Cited

U.S. PATENT DOCUMENTS

| | | | |
|---|---|---|---|
| 5,397,492 A | 3/1995 | Ossian et al. | |
| 5,599,475 A | 2/1997 | Ossian et al. | |
| 5,651,915 A | 7/1997 | Ossian et al. | |
| 5,683,619 A * | 11/1997 | Ossian et al. | 252/70 |
| 6,039,890 A | 3/2000 | Ossian et al. | |
| 7,122,127 B1 | 10/2006 | Ossian | |
| 7,473,379 B2 | 1/2009 | Ossian et al. | |
| 7,758,769 B2 * | 7/2010 | Sheen et al. | 252/70 |
| 8,038,900 B2 | 10/2011 | Ossian et al. | |

* cited by examiner

*Primary Examiner* — Frederick Parker
*Assistant Examiner* — Ann Disarro
(74) *Attorney, Agent, or Firm* — McKee, Voorhees & Sease, P.L.C.

(57) ABSTRACT

An improved process of preparing an ice melter of urea coated with liquid potassium acetate with a further coating of adhered partially hydrated calcium chloride in a roll blender.

8 Claims, 1 Drawing Sheet

US 8,501,271 B1

PROCESS OF MAKING COATED VEGETATION FRIENDLY ICE MELTER

BACKGROUND OF THE INVENTION

The present invention relates to compositions for melting ice on surfaces such as streets, parking lots, sidewalks, etc.

There are many products now used for melting ice and snow. These products can be, but are not limited to, hygroscopic salts such as calcium chloride and magnesium chloride; fertilizers such as potassium chloride and urea; and rock salt and non-slip aggregates like sand, cinders and calcined diatomaceous earth absorbents.

These current commercial products have their advantages and disadvantages. For example, the hygroscopic salts are excellent low-temperature melters but are expensive. Fertilizers cause minimal problems on runoff as they will aid surrounding vegetation, but as ice melters they have poor melting characteristics. Rock salt is inexpensive, but will kill vegetation on heavy runoff and has poor ice melting properties. Aggregates, like sand, do not melt or solubilize, and therefore have difficulty embedding into ice to provide a non-slip surface.

To address some of these disadvantages, blends have been employed, but often each ingredient acts independently with little to no synergistic effect. Agglomerates such as shown in our previous U.S. Pat. No. 5,211,869 issued May 18, 1993, the disclosure of which is incorporated herein by reference, have been successful, but they are complex and expensive in their manufacture and are limited in their ability to synergistically coact with a wide range of base materials. These issues have limited the use of agglomerates.

Accordingly, there is a continuing need for a new ice melting composition, and methods for making same, which allows for a coacting synergistic relationship between the ingredients to provide a commercially acceptable, flowable product at economic prices, and which provides a product that effectively allows good ice melt, favorable abrasion or grip properties and which avoids undesirable environmental problems caused by runoff, such as vegetation kill.

It goes without saying that reducing complexity of process of making blended ice melters also reduces expense providing savings to the ultimate consumer.

Our previous patents: U.S. Pat. No. 5,599,475 issued Feb. 4, 1997; U.S. Pat. No. 5,651,915 issued Jul. 29, 1997 and U.S. Pat. No. 5,683,619 issued Nov. 4, 1997, the disclosure of which are incorporated herein by reference have been successful but they too are complex in their manufacture. The above patents cover a process wherein urea is coated with a potassium acetate solution. Calcium chloride powder is then added as a separate ingredient to the urea to form a coating in a quick mix process. After this process the coated urea particles are blended with calcium chloride pellets. This final product is put through a screening process to pull off excess calcium chloride powder from the process before packaging. There is a need to eliminate at least some of the multiple steps in this process while still producing the calcium chloride coating on the urea portion of the mixture.

In the present process, some of the similar ingredients are used as in our previous patents but processing steps are eliminated. In particular, the current process, when compared with for example U.S. Pat. No. 5,651,915, eliminates a screening process and allows for simultaneous crumbling of calcium chloride pellets into powder and coating with the powder, thus eliminating some of the multiple steps of U.S. Pat. No. 5,651,915.

The method and manner of accomplishing this primary need is the objective of this invention. Accomplishing this and other objectives will be apparent from the description below.

SUMMARY OF THE INVENTION

This invention relates to an improved process for coating urea in a gentle roll type blender and simultaneously crumbling and coating with calcium chloride. The urea is first coated with 1% to 2% by weight of a potassium acetate solution in the roll type blender. After the coating process is completed (approximately one minute) calcium chloride pellet is added to the roll type blender. Calcium chloride will easily degrade from friction of the pellets rubbing against each other in the roll type blender. The calcium chloride powder generated from this process quite readily adheres to the urea particles that have been coated with the potassium acetate solution. After one to ten minutes in the roll type blender the product is discharged to packaging without need of screening the excess powder from the process.

DETAILED DESCRIPTION OF THE PREFERRED EMBODIMENTS

An important aspect of the process involves the sequence of operations which includes depositing dry material to be coated into a mechanical device that produces a blending/rolling action, applying an adhering solution to the dry material to uniformly wet it and, while mixing, adding a solid non-fully hydrated calcium chloride, followed by a mixing with a slow gentle rolling action for a time sufficient to coat and plasticize and finally, discharging without screening to a packaging operation.

Key steps and components of the process and composition are:

(1) Dry material to be coated;
(2) An aqueous adhering solution;
(3) Mechanical mixing with a slow gentle rolling action
(4) Addition of solid material which is non-fully hydrated calcium chloride.

Each is discussed below:

(1) Dry Material to be Coated

The dry material to be coated is urea. Urea as a dry material is available in prill and granular form. The granular form is more desirable as it is a larger particle similar in size to pellet calcium chloride and more suitable for ice melting. Urea can make up from 10% to about 50% of the total mix by weight. The ideal is from about 25% to 30% by weight urea, and preferably 98% to 99% passes through a U.S. #4 standard sieve screen.

(2) An Aqueous Adhering Solution

The adhering solution of choice is potassium acetate. It is extremely hygroscopic, has ice melt properties of its own and adds sheen to the product. Potassium acetate solution is traditionally in the range of 40% to 60% concentration in water, preferably, 50% potassium acetate and 50% water. It is added to the urea at about 1% to about 2% by weight as a coating.

(3) Mechanical Mixing with a Gentle Rolling Action

The desired mechanical mixing action is a gentle rolling action that allows easy coating of the urea granules with the potassium acetate solution. The mechanical mixing then provides contact between the urea granules that have been coated with a potassium acetate solution and calcium chloride pellets. The mixing action provides a gentle friction between the particles. This friction action produces a powder of some of the calcium chloride and it adheres to the coated Urea in a simultaneous crumbling and coating action. The mixer can be a simple drum with a rolling action or even a screw conveyor that turns the product over. RPM of this mixing action can be as low as 3-4 RPM to as high as 60 RPM. The dwell time in the mechanical mixing process needs to be sufficient to generate powder from the calcium chloride to adhere to the urea. This time can range from as little as one minute for calcium chloride that may already contain calcium chloride powder or up to ten minutes mix when the calcium chloride does not contain a powder. The additional mix time will generate a powder from the friction of the tumbling action of the calcium chloride pellets. Non-fully hydrated calcium chloride is preferred because it crumbles to a powder easier.

Figure 1:
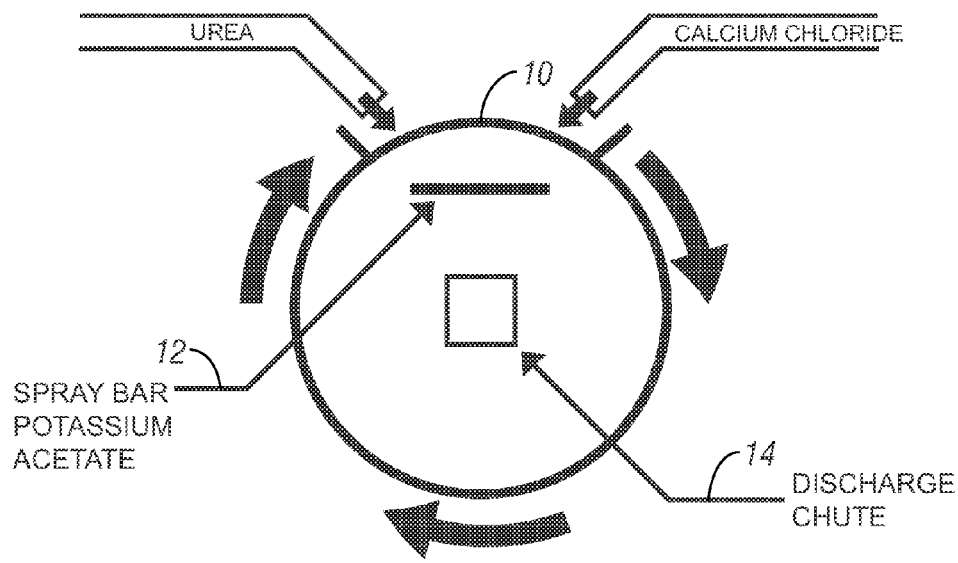
FIG. 1 shows a schematic representation of a typical process for making the product of the present invention.

The drawing of FIG. 1 is a schematic representation of the roll blending operation. It can be described as a general roll blending with a roller drum 10 having a spray bar 12 for spraying potassium acetate onto the rolling and blending urea and calcium chloride pellets. Reference numeral 14 represents a discharge chute at the discharge end of the roll drum 10.

Figure 2:
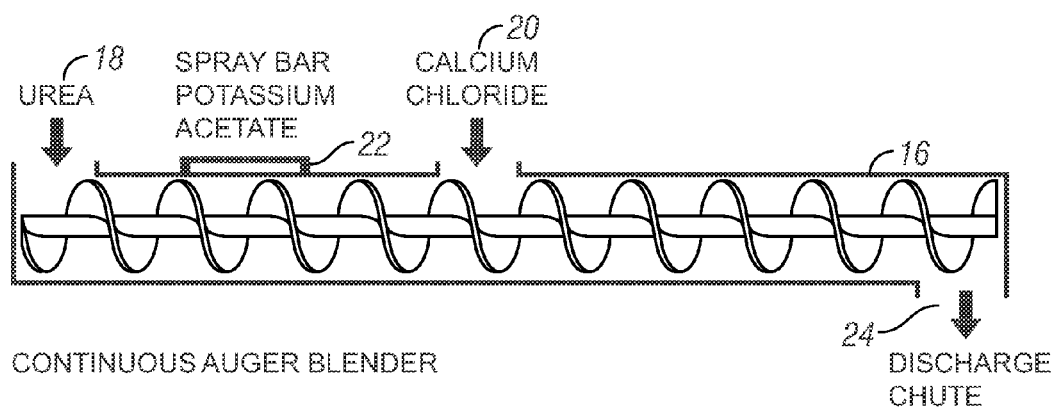
FIG. 2 shows a continuous auger blender process.

FIG. 2 shows how the blending may be done in a continuous auger blender 16 with the urea 18 and partially hydrated calcium chloride 20 having separate entry points. The potassium acetate has a spray bar 22 and the product is discharged at chute 24.

The blender may be a roll blender selected from the group consisting of drum blenders, auger blenders, ribbon blenders, barrel blenders, etc. It may be possible to use pans on an inclined angle but to date it has been found that dwell time is generally insufficient in pan blenders. The dwell time should be for from 1 minute to about 10 minutes, preferably 4 minutes to 5 minutes. The rate of speed should be at a roll blending speed of between about 3 RPM and 60 RPM. Satisfactory results achieved at the lower end of say 4-5 RPM.

(4) The Solid Coatant Material which is Non-Fully Hydrated Calcium Chloride

Calcium chloride as a dry material is available in flake and pellet form. The flake form will range from 70% to 90% calcium chloride. It will usually be a mixture of dihydrates and monohydrates of calcium chloride. The pellet form will range from 90% to 97% calcium chloride and is primarily made up of anhydrous and monohydrates and is preferred. The pellet form of calcium chloride is preferable to the flake form as it blends more easily with granular urea and crumbles to a coating powder easier. The final product as an ice melter is easy to apply with a scoop or spreading device. Both flake and pellets of calcium chloride will powder quite easily during the drying process in manufacturing and in shipping and handling of the bulk product to different packaging locations.

The calcium chloride added can be either Flake/Granular Calcium Chloride or Pellet Calcium Chloride. The Flake/Granular form will range from 70% to 90% calcium chloride. It will be a mixtures of dihydrates and monohydrates of calcium chloride. The Pellet form will range from 90 to 97% calcium chloride and is primarily made up of anhydrous and monohydrates of calcium chloride. The Pellet is the preferred form of the two Calcium Chlorides.

Even though the powder generated in the natural handling of calcium chloride is small, it still remains a nuisance to the packager and the end user of the product. The end user may have issues with the blow back of the powder during application of the product as an ice melter in the winter time. In addition, if the powder should get into the eyes it can become a safety issue.

In our improved process it is desirable to increase the amount of calcium chloride powder in the process as a coatant material for the urea. The powder gets used up. This is easily done by increasing the dwell time in the gentle roll mixer. The powder to be coated on the urea should be a minimum of 1% and not more than 5% and can be within the range of about 2% to about 4% by weight of coated calcium chloride powder. A dwell time of one minute to ten minutes in the gentle mixer is sufficient to generate calcium chloride powder of 1% to 5% that adheres to the urea.

There are significant advantages of this new process. First, it removes the previous step of adding powdered calcium chloride to the process. Second it eliminates the final screening process prior to packaging. It makes urea a much more effective ice melter by providing a low cost, efficient method of applying a calcium chloride coating. The calcium chloride coating will attract moisture and quick start the process of the urea dissolving into ice melting brine. The gentle roll type mixer makes it a one step process or a continuous process if a screw conveyor mixer is used.

What is claimed is:

1. A process of making an ice melter that is by weight from 10% to 50% urea, comprising:
    placing granulated urea in a rolling blender;
    coating the urea with from about 1% to about 2% by weight of a potassium acetate solution having a concentration in water of from 40% to 60% for a time sufficient to substantially coat the urea with potassium acetate solution;
    adding from about 1% to about 5% by weight of the total mixture of non-fully hydrated calcium chloride pellets to the roll blender which contains the coated urea; and
    continuing roll blending for a time sufficient to simultaneously powder the calcium chloride pellets and coat the outside of the previously potassium acetate solution coated urea with calcium chloride powder.

2. The process of claim 1 wherein the ice melter is from about 25% by weight to about 30% by weight urea.

3. The process of claim 1 wherein the potassium acetate solution is a water solution at a concentration of 50:50 water to potassium acetate.

4. The process of claim 1 wherein the ice melter is from about 2% to about 4% by weight of coated calcium chloride powder.

5. The process of claim 1 wherein the roll blending time sufficient is for from about 1 minute to about 10 minutes.

6. The process of claim 5 wherein the roll blending time sufficient is from 4 minutes to 5 minutes.

7. The process of claim 1 wherein the roll blending is at a speed of from about 3 RPM to about 60 RPM.

8. The process of claim 1 wherein the roll blender is one selected from the group consisting of drum blenders, auger blenders, ribbon blenders and barrel blenders.

* * * * *